United States Patent [19]

Merrell

[11] 4,230,016
[45] Oct. 28, 1980

[54] FATIGUE RESISTANT FASTENER AND METHOD OF MANUFACTURING JOINTS THEREWITH

[75] Inventor: Hollis B. Merrell, Renton, Wash.

[73] Assignee: The Boeing Company, Seattle, Wash.

[21] Appl. No.: 929,519

[22] Filed: Jul. 31, 1978

[51] Int. Cl.² .................... F16B 5/02; F16B 35/04
[52] U.S. Cl. ........................... 85/9 R; 403/388
[58] Field of Search .......... 85/1 R, 9 R, 37, 28; 29/525, 526, 522; 403/405, 408, 404, 388

[56] References Cited

U.S. PATENT DOCUMENTS

| | | | |
|---|---|---|---|
| 2,018,913 | 10/1935 | Cautley | 85/37 X |
| 3,561,102 | 2/1971 | Diemer | 85/37 X |
| 3,680,429 | 8/1972 | Briles | 85/37 |
| 3,747,467 | 7/1973 | Rosman | 85/37 |
| 3,748,948 | 7/1973 | Schmitt | 85/9 R X |
| 3,779,127 | 12/1973 | Speakman | 85/9 R X |
| 3,821,871 | 7/1974 | Schmitt | 29/522 X |
| 3,828,422 | 8/1974 | Schmitt | 29/525 |
| 3,840,980 | 10/1974 | Auriol | 85/37 X |
| 4,050,833 | 9/1977 | Briles | 85/37 X |
| 4,111,580 | 9/1978 | Falcioni | 85/9 R |

FOREIGN PATENT DOCUMENTS 997733 7/1965 United Kingdom ............ 85/9 R

Primary Examiner—Ramon S. Britts
Attorney, Agent, or Firm—Christensen, O'Connor, Johnson & Kindness

[57] ABSTRACT

An improved interference fit, fatigue-rated pin-type, nondeformable fastener and joints formed thereby are disclosed in countersunk flush head and protruding flat head embodiments, each characterized by a straight interference fit shank with a lead-in convex shoulder adjacent its threaded end operable to cold work the wall material of the straight fastener hole during fastener insertion, and with the shank progressively expanded in a concave curvilinear profile to its head end starting at a location preferably intermediate the ends of the shank. Curvature of the expansion profile fairs smoothly at relatively large radius into the straight intermediate portion of the shank. At its opposite end, the expansion profile curvature merges into a relatively sharp curvature of very small radius (i.e., of the order of 1% of the first and larger radius) that fairs smoothly into the lower face of the fastener head. Fatigue failures and corrosion problems in the fastener hole wall material starting at the hole entrance, and in some instances problems with warpage of a structural member caused by fastener installation are substantially avoided by the improved fastener.

12 Claims, 12 Drawing Figures

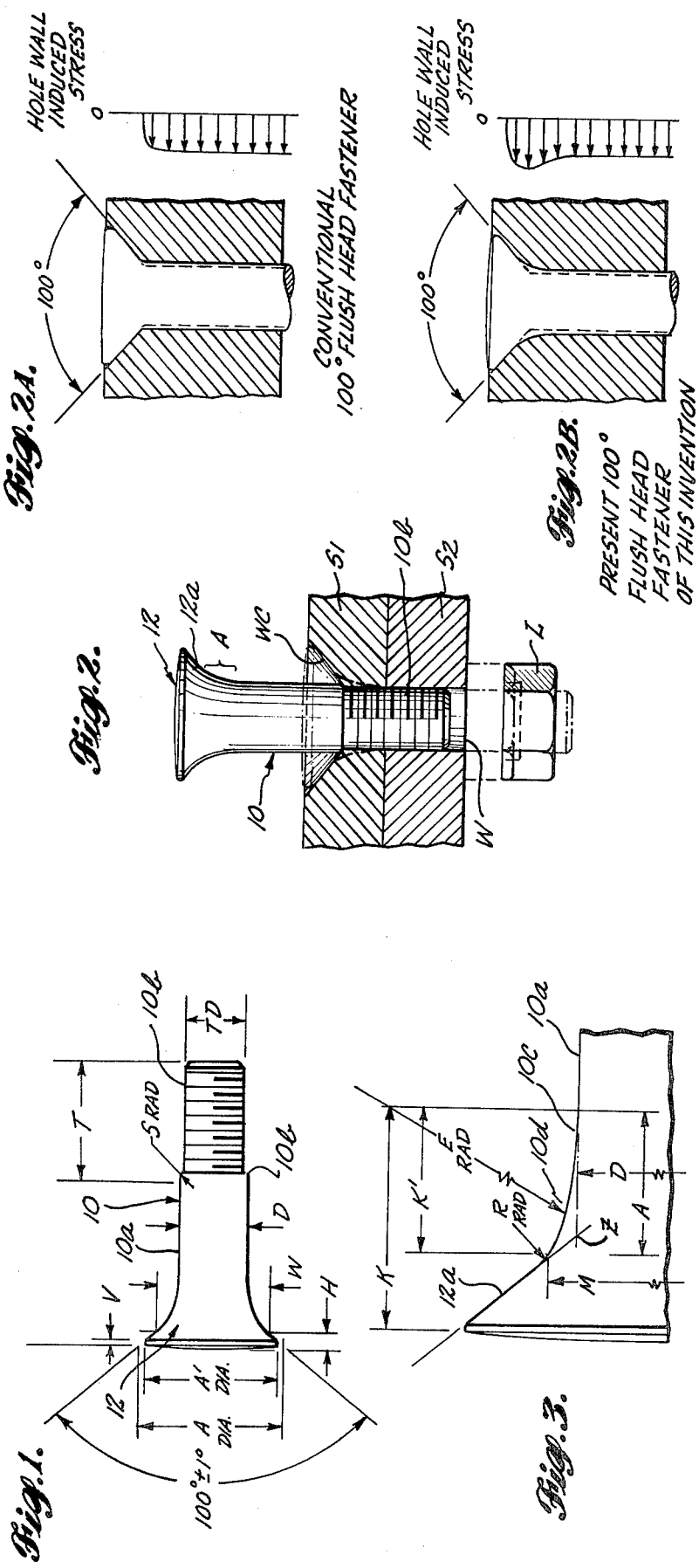

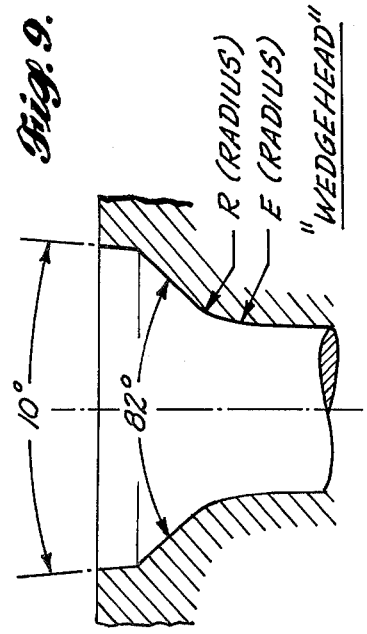
Fig. 9.
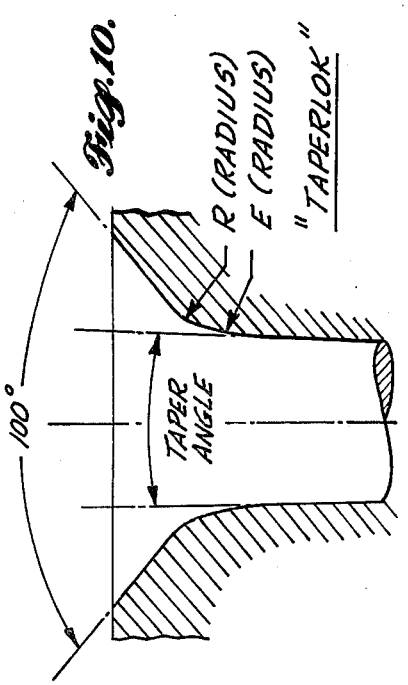
Fig. 10.
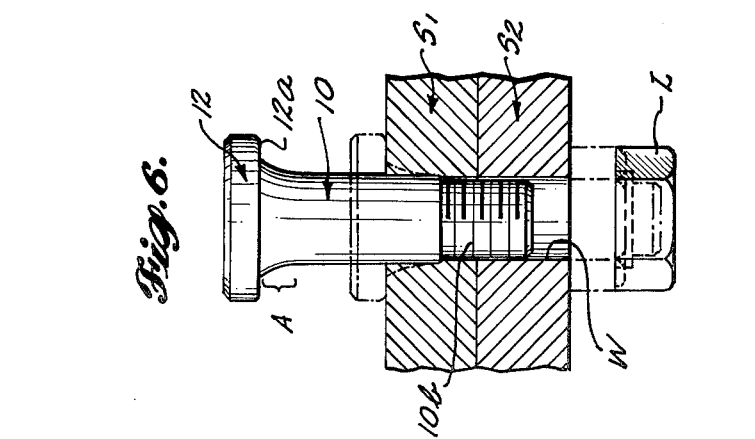
Fig. 6.
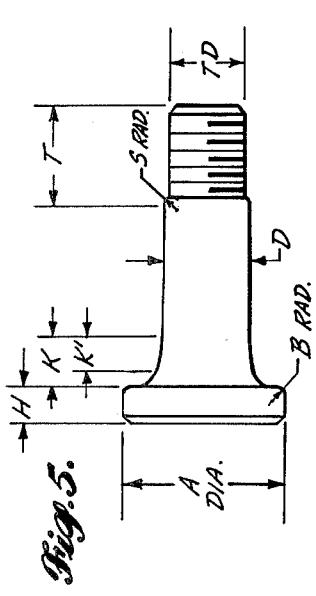
Fig. 5.
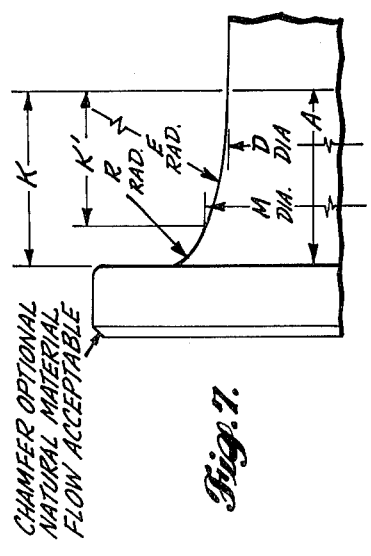
Fig. 7.
Fig. 8.
| NOMINAL THREAD SIZE | A DIA. (TOL. RANGE) | B RAD. (TOL. RANGE) | D DIA. TOL. RANGE BEFORE PLATING | D DIA. AFTER PLATING | E RAD. | H (TOL. RANGE) | K ±.005 | K' ±.0025 | T | M DIA. BEFORE FINISH (TOL. RANGE) | R RAD. (TOL. RANGE) | S RAD. (TOL. RANGE) | TD DIA. (TOL. RANGE) | X | Y |
|---|---|---|---|---|---|---|---|---|---|---|---|---|---|---|---|
| .2500-28 | .400 .387 | .025 .015 | .2555 .2547 | .2560 MAX. | 4.5 | .069 .059 | .240 | .200 | .438 | .2647 .2631 | .030 .020 | .120 .075 | .244 .241 | .006 | .0005 |
| .3125-24 | .487 .475 | .025 .015 | .3180 .3172 | .3185 MAX. | 5.0 | .078 .068 | .250 | .210 | .513 | .3274 .3258 | .030 .020 | .120 .075 | .306 .302 | .006 | .0005 |
| .3750-24 | .580 .565 | .025 .015 | .3805 .3795 | .3810 MAX. | 5.5 | .088 .078 | .270 | .230 | .538 | .3905 .3889 | .030 .020 | .160 .100 | .368 .364 | .006 | .0005 |

FATIGUE RESISTANT FASTENER AND METHOD OF MANUFACTURING JOINTS THEREWITH

BACKGROUND OF THE INVENTION

This invention relates to improvements in interference fit, nondeformable metal, headed round pin-type fasteners cooperable with structural members of relatively deformable metal to be fastened thereby, the most important present use of the invention being in aircraft structural joints. More specifically the invention relates to high strength, lightweight fasteners for applications in which maximum resistance to fatigue failure is a vital requirement. The invention is herein illustratively described in reference to the presently preferred embodiments thereof; however, it will be recognized that certain modification and changes therein with respect to details may be made without departing from the essential features involved.

Prior art patents disclosing fasteners of varying degrees of background interest to the present invention are listed below.
Schmitt, U.S. Pat. No. 3,821,871
Schmitt, U.S. Pat. No. 3,828,422
Schmitt, U.S. Pat. No. 3,748,948
Briles, U.S. Pat. No. 3,680,429
Briles, U.S. Pat. No. 4,050,833
Speakman, U.S. Pat. No. 3,779,127
Rosman, U.S. Pat. No. 3,747,467
Diemer, U.S. Pat. No. 3,561,102
Auriol, U.S. Pat. No. 3,840,980
Cautley, U.S. Pat. No. 2,018,913

The above listed patents are directed to fasteners generally of background interest to this invention inasmuch as they illustrate prior art concepts for increasing the strength of durability of a joint through deformation and stressing of joint components. These fasteners are of two basic types. In one, the hole wall material is deformable relative to the hard body of the fastener which is made larger than the hole so as to produce what is termed an interference fit placing the hole wall material under permanent stress. With such fasteners, precise control of final stress and stress distribution in the hole wall material, i.e., in the structural members in which the hole is formed, is critical to the performance characteristics of the joint. The original shape of the fastener being maintained throughout the installation, the fastener profile in relation to original hole profile becomes the control reference upon the basis of which the stress pattern in the structural parts can be reliably predicted and consistently reproduced with the necessary precision.

In the second basic type of fastener illustrated in the above listed patents, the so-called rivet principle is employed wherein the fastener itself being of deformable material undergoes a change of shape during or upon completion of the installation. In some cases the structural parts being joined may also undergo deformation.

The present invention is of the first mentioned type, namely, a nondeformable, interference fit, precision stress control fastener. It is typically useful in aircraft structural joints, an example being in the connections between the aluminum alloy wing skins and wing stiffeners which are subjected to repeated cycles of loading during flight. In such applications, the fasteners must be light in weight and strong, typical fastener materials being 6Al-4 V, titanium and high strength steels. The hardness and strength of such materials used in these interference fit fasteners provide a basic assurance of factor of safety, both in static load and in fatigue ratings of the fastener itself as the basic primary joint component. Consequently, the limiting factor on the strength and fatigue durability of structural joints using such fasteners lies in the fastened condition of the structural members secured together. This fatigue limitation has been observed through fatigue rating tests and other observations based on a variety of fasteners and joints formed with them.

Accordingly, a long standing objective of fastener technology and a basic purpose of this invention has been to improve the fatigue characteristics of such fastener joints, and particularly the fatigue durability of the structural part material surrounding the fastener, especially that at the end of the fastener hole beneath the fastener head. It is observed that many fatigue failures that do occur tend to originate at this location. And it is also in the region of the fastener head where corrosion problems seem to concentrate when they do arise with untreated fastener and/or wall material surfaces. The two problems are found to be traceable to undesirable residual stress conditions and stress discontinuities in the wall material surrounding the hole entrance. Moreover, in some prior fasteners using tapered shanks installed in straight holes, warpage and bowing of structural members caused by fastener-induced stresses have occurred. While great strides have been made in interference fit fastener technology by the aircraft industry, the critical nature of the subject imposes its own high priority on the continued search for still further improved fasteners. Accordingly, while prior art contributions, such as those of the above listed Schmitt patents, have played a major role in attaining the durable safety of aircraft structural joints realized in current aircraft construction, it is an object hereof to achieve still further improvements therein and to do so by a precision stress control fastener design radily suited to present day manufacturing capabilities of the aircraft industry.

Yet another object hereof is to devise an improved interference fit stress control fastener and fastener joint incorporating the same wherein any remaining problem tendency of prior art joints to allow cracks to start around the hole entrance at the head end of the fastener are substantially reduced.

A related object hereof is to achieve a fastener joint with reduced tendency for corrosion to occur in the joint surfaces of the fastener head and surrounding wall material.

Still another object hereof is to devise such fastener and joint improvements applicable both to protruding head type fasteners and to flush head type fasteners in which the fastener hole is conically countersunk and the underside of the fastener head is substantially matched in nominal shape.

It is also an object of this invention to provide an improved fastener and joint using the same that reduces any tendency for galling and scoring of the interference fit hole wall, or of excessively working the wall material being "coined" by fastener insertion through an elongated straight cylindrical hole with an interference fit fastener.

A specific object hereof is to so modify and improve the stress distribution pattern in the hole wall material surrounding a structural joint fastener as to avoid dynamic load stress concentrations in such material that have the potential to start localized fatigue failures after prolonged load cycling of the joint; also to avoid the tendency with certain prior art fasteners using tapered shanks installed in straight holes to induce bowing stresses or warpage in one of the joined structural members.

A further object hereof is to devise an improved interference fit stress control fastener for straight cylindrical holes that substantially avoids or eliminates the previously experienced adverse effects of hole wall galling, scoring and damage due to the fastener expanding the hole during entry and/or being cocked during initial installation.

BRIEF DESCRIPTION OF THE INVENTION

With the foregoing and related objectives in view, the improved fastener, fastener joint and method of manufacturing fatigue resistant joints utilizes a novel fastener body and associated head configuration in an interference fit, stress control fastener of relatively non-deformable metal that may loosely be characterized as a "trumpet" profile configuration. In brief terms, the fastener body or shank comprises a straight (i.e. cylindrical or tapered) main body portion larger in diameter throughout its length than the fastener hole and led during fastener insertion by a convexly rounded annular lead-in shoulder that is first to enter the straight fastener reception hole during fastener insertion. Starting at a location preferably intermediate the ends of the fastener main body portion, the fastener undergoes progressive expansion in diameter with a concave substantially curvilinear profile that fairs smoothly into the straight portion and that starts with a relatively large radius at least several times (such as twenty times) the fastener diameter at that location. At the underside of the fastener head the curvilinear profile merges smoothly with the underside surface of the head through a very short and much more sharply curved terminus (i.e., such as under 1% of the starting radius mentioned). For convenience of manufacture as the preferred form, the starting relatively large curvature radius of the expansion profile remains substantially constant over nearly the full length of the curvilinear shape defining the concave curvilinear profile, and the sharply curved terminal portion of the profile through which it merges with the underside of the head also has a substantially constant radius less than one percent (1%) of the larger radius. However, it is to be recognized that the exact shape of the concave substantially curvilinear expansion profile portion of the fastener shank merging smoothly at its opposite ends with the underside of the head and straight portion of the shank may be varied, as may its starting point adjacent the lead-in shoulder, while achieving the "trumpet" shape stress control effects to be more fully described hereinafter.

In the flush head countersunk fastener embodiment of the invention the novel trumpet shape stress control effect of the installed fastener includes substantial elimination of the notch effect at the hole-countersink nominal surface junction (i.e., the junction that exists before coining of its shape by fastener installation). This novel fastener profile significantly and appropriately increases the fastener-wall interference stress effect in the hole wall material well up into the countersink surface region above the initial nominal junction described above and thus alleviates the condition for starting of fatigue failures at that location in the joined structural part. Furthermore, it achieves these results without the shortcomings toward which certain of the above-stated objectives are directed, namely, without risking excessive galling, scoring and overworking of the wall material in the process of forcibly inserting of the fastener and tightening the locking means by which the fastener is placed under permanent tension over its gripping length to permanently clamp the structural members together with all parts placed under residual stress. Preferably the improved flush head fastener employs the standard 100° matching countersink and head underside surface angle.

The invention similarly overcomes the residual stress discontinuity attending "notch effect" (with attendant stress pattern abrupt discontinuity) at the hole entrance beneath the head of the protruding head fastener embodiment of the invention as well. In both embodiments, namely, the countersunk flush head and the protruding head versions, the initially larger radius and final small radius of the smooth-merging, concave, substantially curvilinear profile of the fastener shank and head transition establishes a smoothly graduated, unique residual stress distribution pattern in the structural member or members beneath the fastener head by which it achieves maximum fatigue rating of the fastener.

The curvilinear expansion profile portion contiguously merging from the leading straight portion of the fastener shank provides still another advantage. Former problems during production conditions of cocking or canting of the fastener axis off alignment with the hole axis causing hole deformation and degradation with some prior art fasteners are minimized by the improved fastener.

These and other features, objects and advantages of the invention will become more fully evident as the description proceeds with reference to the accompanying drawings.

BRIEF DESCRIPTION OF THE DRAWINGS

FIG. 1 is a side view of a flush head or countersunk fastener embodiment of the invention;

FIG. 2 is a sectional side view of the same fastener and associated locking element in process of installation in a countersunk receiving hole formed in structural members to be joined;

FIGS. 2A and 2B show induced stress patterns produced respectively by conventional flush head and the improved flush head fasteners;

FIG. 3 is an enlarged fragmentary profile outline of the head end and adjacent shank portion of the same fastener illustrating the geometric configuration of the curvilinear expansion portion of the fastener shank where it joins the head; and FIG. 4 is a chart specifying the preferred dimensions and dimensional relationships of the same fastener in three different sizes typical of its application in aircraft structures. It will be appreciated that, in FIGS. 1, 2 and 3, contours and related proportioning of the critical parts of the fastener have been exaggerated to aid in the illustation and description of the invention. The actual dimensioning in the examples given in FIG. 4 shows that without such exaggeration in the drawings, graphic depiction of the critical features would be a practical impossibility at the drawing scale required herein.

FIGS. 5, 6, 7 and 9 correspond to FIGS. 1, 2, 3 and 4, respectively, applied to a protruding head fastener embodiment of the invention.

FIG. 9 is a side sectional view of a fastener installation employing a so-called "Wedgehead" or double angle head type fastener employing the invention.

FIG. 10 is a side sectional view of a fastener installation employing the so-called "Taperlok" type fastener in which the fastener body is conical in form, incorporating the inventive concept.

DETAILED DESCRIPTION WITH REFERENCE TO DRAWINGS

Referring to FIGS. 1-4, inclusive, the illustrative and preferred form flush head embodiment of the improved fastener comprises a body or shank 10 and a head 12. The shank or body 10 comprises a straight portion 10a of slightly larger diameter than the diameter of hole W in the mutually superimposed structural parts $S_1$ and $S_2$ to be joined so as to produce an interference fit therewith throughout the straight length portion of the hole. At one end of the fastener, the straight portion 10a terminates in a threaded protruding portion 10b of reduced diameter with threads that will pass freely through the fastener receiving hole W. As shown in FIG. 2, a nut or similar locking element L is threadedly engageable with the threads on portion 10b and when tightened completes drawing the fastener tightly to a seat in the hole under longitudinal tension established in the shank. This permanently maintained tension in the fastener is sufficient to complete the working and forming of the fastener wall material beneath the fastener head and to maintain the wall material under residual stress controlled by fastener shape as described. In the process of forcing the fastener through the hole W, coining or working of the hole wall material throughout its length is effected without appreciable scoring or galling of the hole wall surface W of the material. The action is assured during the insertion by the lead-in effect of the convexly rounded annular rib 10f at the transition between the straight portion 10a and the reduced-diameter threaded portion 10b in conventional manner.

At a longitudinal position 10c intermediate the ends of the shank, the shank diameter undergoes a progressive increase throughout the remaining length of the shank to the head. This expansion portion of the shank occurring in region A follows a concave substantially curvilinear profile. At the point 10c where this curvature of expansion commences, the radius of curvature E is relatively large (i.e., of the order of 20 times the diameter of the shank straight portion 10a) and merges smoothly in tangential relationship with the straight portion 10a so there is no visible or material discontinuity at the juncture. Preferably the curvature follows a plain circular arc at the radius E until the contour approaches mergence with the conical undersurface 12a of the countersink rivet head 12. Final mergence with the head surface 12a occurs through a much more sharply curved radius R (preferably less than 1%) that merges smoothly (tangentially) at one end with the curvature of radius E and at the opposite end with the radially rectilinear underside surface 12a with no material or observable discontinuity at either of these points of mergence either. At the point of mergence of the large and small radius curvatures, the shank diameter is preferably about 2% larger than it is in the straight portion 10a. The resultant contoured configuration of the head end portion of the fastener shank including the underside of the head, 12a, and the concavely substantially curvlinear portion extending over region A most generally resembles the end of a trumpet horn, for lack of a more closely pertinent analogy coming to mind. The resulting specially shaped fillet at the juncture between the fastener head and body as depicted in FIG. 3 on an exaggerated scale is to be compared with the nominal annular intersection at Z representing the imaginary intersection of the projected cylindrical straight portion 10a and the straight element conical portion surface 12a at the underside of the head. This same imaginary projected intersection of the head and body surfaces represents the actual nominal or initial shape of the hole wall surface at the base of the countersink in hole W in the structural $S_1$ before the fastener is inserted to reshape that wall surface. The hole is countersunk at $W_c$ in the exposed exterior surface of the structural part $S_1$ at substantially the same cone angle as the underside of the rivet head, namely, 100 degrees (plus or minus one degree) as shown in FIG. 1. Thus, in this improved fastener, reliance for residual stressing of the hole wall material is not placed upon employing a fastener head cone angle materially smaller than the cone angle of the countersink hole wall surface in the adjacent structural member being joined to the overlapping member as, for example, in Schmitt U.S. Pat. Nos. 3,821,871; 3,828,422 and 3,748,948.

With reference to FIGS. 1-4, inclusive, it will be noted that the various dimensions and curvature radii of the preferred embodiments in three different fastener sizes are depicted in illustrated embodiments by reference to the chart listings. In that same regard, using conventional nomenclature in the art, it will be noted that the grip length of the fastener is measured from the top side of the "V" dimension (i.e., the blunted annular edge thickness of the head rim) to the end of the straight shank portion 10a at the point where it merges with the convexly rounded lead in shoulder 10f. With the fastener installed, this latter point lies substantially in the plane of the flat exterior surface of the underlying structural member $S_2$ against which the locking element L bears in the installed condition of the fastener.

In the same context, as a specification to a manufacturing precision, the curvature of the expansion portion at radius E where it merges at M with the sharply curved radius R and where it merges with the straight portion 10a of diameter D should be concentric to within 0.0005 inches. By the same token, the conical undersurface of the head 12 should be concentric with the straight portion 10a to within 0.0005 inches. Standard dimensional "gauge protrusion" (H) specifications (FIGS. 1 and 4) should be satisfied, as should surface finish texture requirements according to industry standards for all surfaces of the rivet body 10 at least to the point of mergence with the underside surface 12a of the fastener head. Standard shank coating or finishing practices limiting the thickness of the coating to the range of 0.0002 to 0.0004 thickness in the finished product should also be observed.

The blunting of the outer rim corner of the fastener head represented by the dimension V may be produced either by a flat annular (cylindrical) surface or by a curved edge, at the manufacturer's option.

With the improved fastener installed iwth the hole wall material permanently stressed in the critically controlled manner governed by special shaping of the head end of the shank portion and by tension in the fastener body, it is found through extended fatigue testing of fastener joints that the tendency with prior fasteners for fatigue failures to occur starting at the entrance region of the straight hole immediately beneath the fastener head is substantially eliminated. Moreover, the other advantages described herein are also attained. It will be noted that there is no permanent deformation or yield of the fastener itself during installation or residually under static conditions, the fastener being made of a much harder and less readily deformable material than the metals used in the structural members $S_1$ and $S_2$ in the intended joint structures of this invention. The controlled pattern of increase in hole wall interference stress over the critical region A is found to substantially eliminate the so-called "notch" effect abrupt stress change that otherwise occurs at an abrupt physical transition from a straight (or straight-tapered) shank intersecting the base of the normal countersink surface, such as with a conventional 100° head cone fastener installed in a 100° cone countersunk fastener hole. Since the interference (i.e., produced by the point for point diameter difference between fastener and hole wall) over region A (FIG. 2) is approximately 0.010 inches greater at the junction Z that the straight shank portion hole wall interference (which varies from 0.003 to 0.0065 inches) the total interference can range between 0.013 and 0.0165 inches. Moreover, the gently curved portion of the concave expansion region at radius E is caused to fair smoothly into the 100 degree conical head undersurface 12a at approximately 0.005 inches towards the top of the fastener head from the theoretical intersection Z. The increased interference produced by the gradually curved portion at radius E serves two functions: firstly, it virtually eliminates the effect of degradation of the hole entrance due to installation of the fastener as in previous fasteners, and secondly it provides additional and specially controlled compressive stress pattern in the hole wall material in the countersink region. FIGS. 2a and 2b depict the induced hole wall material stress, respectively, with a 100 degree conventional fastener and the induced stress with a modified 100 degree fastener of this invention.

In connection with determining and defining the character of the expansion profile of the fastener body as being concavely "substantially curvilinear," reference is being made to the requirement that the profile surface be concavely curved, or substantially curved from beginning to end in a smoothly continuous manner and without any appreciable interruption. However, it is contemplated that most, if not all, of the desired effects can also be achieved with the profile straightening out (rectilinearly), or substantially so, for a short region intermediate the ends of the main (large radius) curve if done with smooth mergence or tangentiality with the adjoining curved portions. Likewise, while it is preferred that the concave curvilinear profile be made up of two circular arcs, one of large radius and one of relatively very small radius (i.e., approximately 1% or less of the large radius) it is also contemplated that other specific concave curvilinear forms will work with substantially equal effect, such as a hyperbolic or parabolic curve, as examples. In each instance, however, the final curve at the head end where the profile merges with the underside of the rivet head, must be at a very small radius of the order of 1% or less of the curvature at the opposite end where the profile merges tangentially with the straight, constant-diameter portion of the shank. These other specific shapes (other than the two-radius curvature) have not been made and tested, but their potential operability in the manner indicated is predicted provided they closely approximately the specific curvature of the preferred embodiment that has been successfully tested.

Furthermore, with the improved fastener characterized by an expansion portion that is concave and substantially curvilinear throughout, the added advantage is afforded of minimizing stress-inducted bowing or warping of the upper sheet $S_1$ relative to the lower sheet $S_2$.

In the manufacture of fastener joints according to this invention, the hole formed in the mutually superimposed structural members is smaller in diameter than the fastener main body portion, thereby creating an interference fit as the fastener is progressively inserted into the hole. As the insertion continues, the "trumpet" shaped flare of the fastener main body portion requires insertion force that expands the hole wall adjacent the head end of the hole in the described pattern of stress in order to continue to insertion movement until the head is seated against the adjacent structural member and the opposite end of the fastener protrudes through the members to receive a fastener-tensioning nut or other locking means.

With reference to the protruding head embodiment depicted in FIGS. 5 to 8, inclusive, similar principles apply with similar numerical and numerical proportion designations being used for the examples of three different fastener sizes. In each the underside of the head forms a planar surface that seats flatly against the flat (noncountersunk) upper surface of the structural members $S_1$ and $S_2$ being joined together. In the chart of FIG. 8, the X and Y columns, indicate required minimum eccentricity tolerances. For example, the Y value is the maximum permissible eccentricity of the fastener at the diameter regions represented by the E radius, the M diameter and the D diameter portions, whereas the X value provides the maximum tolerance permitted for concentricity as between the A and D diameter portions of the fastener shank. As in the previous embodiment, the S and E transition radii curves must fair into the shank portions of the fastener straight portion without visible or material discontinuity.

In FIG. 9 the principles of the invention are illustrated in a double-angle head, often referred to as a "Wedgehead", fastener. In FIG. 10, illustrating concepts of the invention applied to a fastener having an elongated conical body, sometimes designated a "Taperlok" fastener, the fastener hole is also tapered at the same angle as the body but is smaller in diameter to achieve interference fit. The underside of the fastener head is matched to the countersink surface of the hole, resulting in no interference around the head. With the multiply curved transition between the body and head taught by the present invention, as shown, the stress modification effect at and immediately beneath the intersection of body and head improves the fatigue performance of the installed fastener. However, with Taperlok fasteners there is minimal galling or scoring effect caused during fastener installation, so that the advantages achieved by the invention in this application are not as significant or extensive as in its application to fasteners having cylindrical body form. It should also be noted that head configuration may vary. For example, if it is a countersink head, the cone angle may vary, or the surface may be curvilinear instead of straight conical, or it may be angled at two or more different slopes to the axis as in FIG. 9.

In this specification and in the appended claims, the term "straight" applied to the fastener receiving hole and/or to all or a portion of the fastener body is intended to denote the linearity or straightness of an element serving as the generatrix of the figure of revolution constituting the surface. Thus a Taperlok (i.e. conical fastener) body is "straight" over the length thereof leading into the complex curvature employed in this invention, and the same in the case of a cylindrical body fastener.

Accordingly the improved fasteners, characterized by the novel shank profile contour to produce a unique controlled stress pattern in the hole wall material, not only provide a more durable fatigue-rated fastener joint, but studies show they also exhibit the other advantages mentioned herein. Within this novel concept of design, the invention as defined in the claims that follow is considered to allow for a limited range of equivalent curvature variations to achieve equivalent results in essentially the same manner.

The embodiments of the invention in which an exclusive property or privilege is claimed are defined as follows:

1. For fatigue resistant structural joints, an interference fit, relatively nondeformable metal, headed, round pin-type fastener cooperable with structural members of relatively deformable metal to be fastened having a round straight fastener receiving hole therein, said fastener comprising an elongated round shank terminating at one end in a fastener head having an underside surface, said shank comprising a main body portion of straight cylindrical configuration larger in diameter than said hole and that terminates at its end opposite the head through a convexly rounded lead-in shoulder and, beyond such shoulder, in a protruding locking end portion of smaller diameter than said main body portion, said shank main body portion undergoing progressive expansion of diameter from said straight cylindrical configuration through a concave substantially curvilinear profile lengthwise thereof toward the fastener head with a relatively large starting radius of curvature tangential to said cylindrical configuration and continuing therefrom through a final concave curvature of relatively small radius fairing smoothly therewith and with the underside surface of the fastener head.

2. The fastener defined in claim 1, wherein the underside surface of the head is straight in radial directions.

3. The fastener defined in claim 1 having a countersink type head with substantially conical underside surface of the order of 100° cone angle.

4. The fastener defined in claim 1 having a protruding type head with a substantially planar underside surface.

5. The fastener defined in claim 1 wherein the underside surface of the fastener head comprises at least two conical surfaces of differing cone angles.

6. The fastener defined in claim 1 wherein the main body portion curvilinear profile starts at a location intermediate the ends of said main body portion and is otherwise cylindrical to the lead-in shoulder.

7. The fastener defined in claim 1 wherein the main body portion curvilinear profile starts at a location intermediate the ends of said main body portion and otherwise conical, tapering to said lead-in shoulder.

8. The fastener defined in any of claims 1-7, wherein the concave curvilinear profile starts as a first circular arc of substantially constant radius at least several times the diameter of said body portion adjacent said lead-in shoulder, and that terminates as a second circular arc of relatively small and substantially constant radius of curvature.

9. The fastener defined in any of claims 1-7 wherein the concave curvilinearity of the shank increases the shank diameter by substantially two percent (2%) from its starting location to the commencement of the terminal curvature of relatively small radius.

10. The fastener defined in any of claims 1-7 wherein the concave curvilinearity of the shank increases the shank diameter by substantially two percent (2%) from its starting location to the commencement of the terminal curvature of relatively small radius and wherein the radius of curvature of the terminal concave curvature of relatively small radius is less than substantially one percent (1%) of the radius of said first circular arc of shank curvature.

11. A fastener as defined in any of claims 1-7, combined with structural members of relatively deformable metal fastened together thereby having a round straight hole therein receiving the fastener with an interference fit, and a locking element on said fastener shank protruding end portion tightened for clamping the structural members together between such locking element and the fastener head under tension in the fastener that maintains the underside surface of the fastener head seated firmly against the adjacent surface of the underlying structural member.

12. The method of manufacturing fatigue-resistant structural joints with interference fit fasteners joining together structural members of relatively deformable metal by fasteners of relatively nondeformable metal, headed, round pin configuration, said method comprising:

forming a straight fastener-receiving round hole through mutually superimposed structural members, forcing through said hole the body of such a fastener larger in diameter throughout its length than the diameter of the hole, which body diameter progressively increases in a concave curvilinear profile starting tangentially therewith at relatively large radius adjacent its end initially inserted, said curvilinear profile terminating with smooth curvilinearity through a relatively small radius on the underside of said head, continuing the insertion and increasing the force of insertion as the curvilinear profile diameter entering the hole increases thereby to increase the wall stress in the structural member around the hole in the region thereof adjacent to a fastener head, until the fastener head itself is forced into contact with the adjacent structural member, with the opposite end portion of the fastener protruding through the structural members, and locking the fastener in the hole by means including said protruding end portion operable to react against the adjacent structural member and thereby to exert tension stress lengthwise in the fastener.

* * * * *

UNITED STATES PATENT AND TRADEMARK OFFICE
CERTIFICATE OF CORRECTION

PATENT NO. : 4,230,016
DATED : October 28, 1980
INVENTOR(S) : Hollis B. Merrell

It is certified that error appears in the above-identified patent and that said Letters Patent are hereby corrected as shown below:

Column 2, line 39: "radily" is changed to --readily--.

Column 4, line 4: "forcibily" is changed to --forcibly--.

Column 6, line 62: "iwth" is changed to --with--.

Column 7, line 68: "approximately" is changed to --approximate--.

Column 8, line 18: "continue to insertion" is changed to --continue the insertion--.

Column 9, lines 60 & 61: "portion and otherwise" is changed to --portion and is otherwise--.

Signed and Sealed this

Third Day of February 1981

[SEAL]

Attest:

RENE D. TEGTMEYER

Attesting Officer    Acting Commissioner of Patents and Trademarks